(12) United States Patent
Rybkoski et al.

(10) Patent No.: US 6,581,288 B1
(45) Date of Patent: Jun. 24, 2003

(54) METHOD OF ASSEMBLING A PACKAGE BEARING AND AN ASSEMBLY TOOL THEREFORE

(75) Inventors: Thomas J. Rybkoski, Uniontown, OH (US); Richard H. Miller, Jackson Township, OH (US); Robert W. Hacker, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/125,309

(22) Filed: Apr. 17, 2002

(51) Int. Cl.⁷ .................. B23P 17/00; B21D 53/10
(52) U.S. Cl. ............... 29/898.062; 29/244; 29/256; 29/281.4; 29/464; 29/898.064; 29/898.07; 29/898.09; 29/898.11
(58) Field of Search ............... 29/898.062, 898.064, 29/898.07, 898.09, 898.11, 402.02, 464, 244, 256, 281.4, 724

(56) References Cited

U.S. PATENT DOCUMENTS

| | | | | |
|---|---|---|---|---|
| 2,658,807 A | * | 11/1953 | Wallgren |
| 4,542,571 A | * | 9/1985 | Sullivan |
| 5,442,854 A | * | 8/1995 | Koltookian et al. |
| 5,623,761 A | * | 4/1997 | Chiang |
| 5,794,341 A | * | 8/1998 | Carlini |

\* cited by examiner

Primary Examiner—P. W. Echols
(74) Attorney, Agent, or Firm—Polster, Lieder, Woodruff & Lucchesi, L.C.

(57) ABSTRACT

An application tool (and a method of use of the tool) is provided for assembling an outboard seal and roller assembly into a hub unit. The tool and method allow for the use of standard seals and standard cage/roller assemblies, thus avoiding the problem associated with the use of special cages or oversized large-diameter seals.

18 Claims, 5 Drawing Sheets

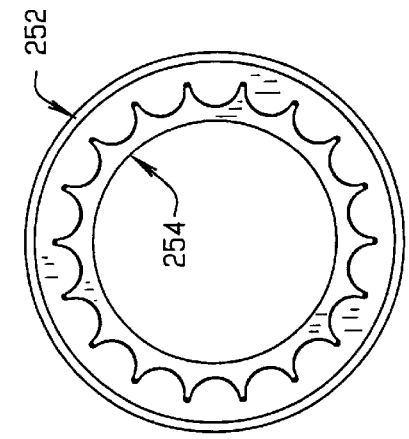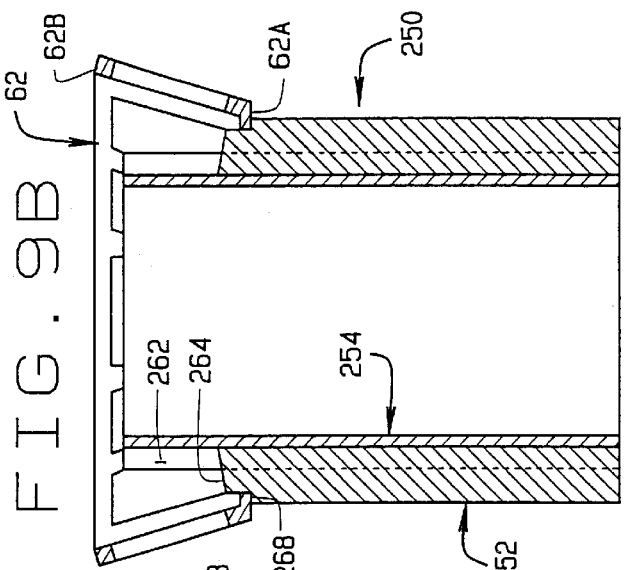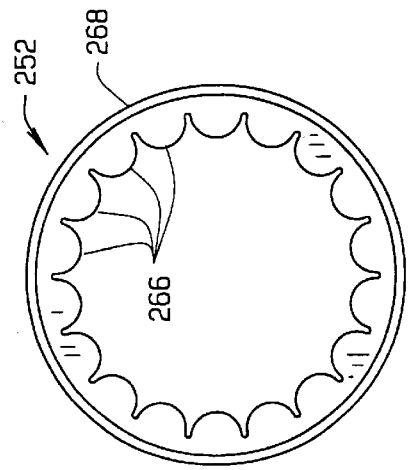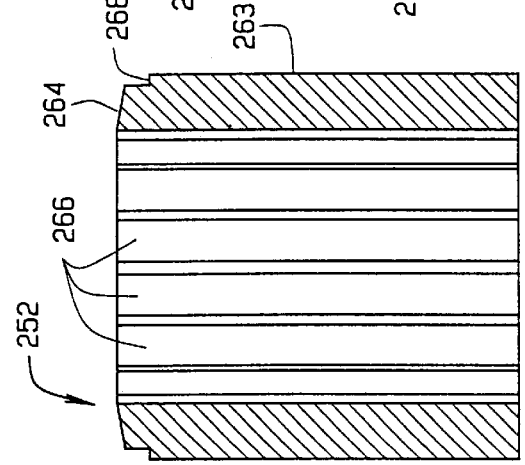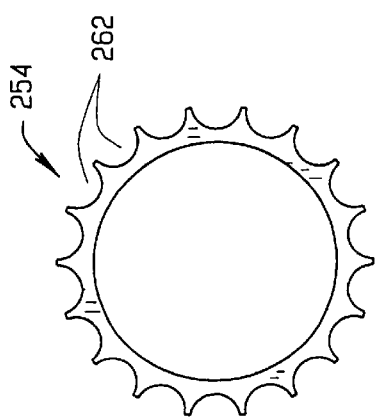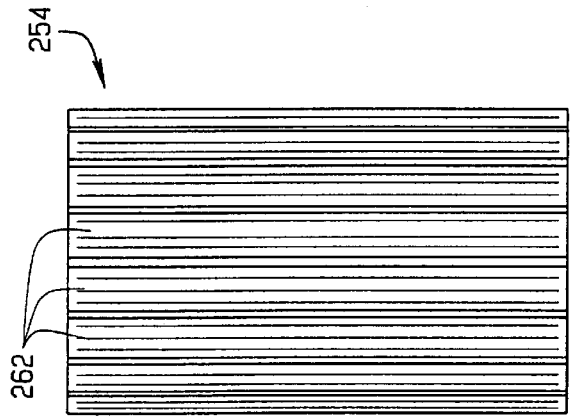

METHOD OF ASSEMBLING A PACKAGE BEARING AND AN ASSEMBLY TOOL THEREFORE

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates to a method of assembling a GEN III packaged bearing in a hub, and, in particular, to a method which facilitates the insertion of an outboard seal using an application tool.

The assembly of GEN III type packaged bearing products is difficult due to the minimal space between the outboard cup, housing, or knuckle face and the inboard face of the hub flange. A seal pressed into the bearing, housing or knuckle is required to minimize or eliminate contaminants entering the bearing from the roadway. Certain packaged bearing designs are such that the outboard seal cannot be installed prior to the installation of the rollers and cage into the bearing cup/housing or knuckle, therefore, the rollers and cage must be installed before the seal and the hub.

Two options are currently available to assemble this type of bearing. One is the design of a "below center" cage in which the rollers are installed from the outside diameter of the cage, as opposed to the more traditional design in which rollers are installed from the inside diameter of the cage. "Below center"0 cage designs are not considered the standard method of retaining rollers in tapered roller bearings. Therefore, the cost of such items becomes higher than the more conventional cage design. Assembly of the bearing using a "below center" cage design requires additional manipulation of the bearing cup, housing, or knuckle to install the rollers and cage, increasing the cost of the assembly.

Another option is to use a specially designed cage in which the rollers are contained in the cage. However, the use of a special cage design can result in increased cost and special assembly operations.

The problem to be solved is how to get the outboard seal of the hub unit in place. In a typical GEN II hub unit, the outboard seal is installed in the bearing before the bearing is installed on the hub. It is only when the outboard cone is integral with the hub, as in a GEN III hub unit, that it is difficult to install the outboard seal. The reason for this difficulty is that the outboard seal has to be in place on the hub before the rollers are installed on the hub and when the hub/seal/rollers are inserted into the cup, there must be some way to press the seal into the cup, housing, or knuckle with a tight fit.

GEN III ball bearings (as opposed to tapered roller bearings) have been in use for some time. However, since it is common for the balls of ball bearings to be held in the cage as a set, they do not encounter this problem, because the ball/cage set can be installed in the cup, and then the outboard seal pressed into the cup, housing or knuckle, and then the hub inserted into the cup.

There are a number of solutions when tapered rollers are used. A typical solution is to use a split puller that fits between the hub flange and the seal. This puller pulls the seal into place as the spindle is inserted into the cup. However, as the hub unit is made narrower, there is no room for the puller. This is especially true, if a ribbed flange (such as disclosed in co-pending application Ser. No. 981,539, filed Oct. 17, 2001, which is entitled "Wheel Hub With Stiffened Flange", and which is incorporated herein by reference) is used.

Other solutions involve the use of special cages or very large ID seals. For example, U.S. Pat. No. 6,287,015 discloses the use of a special cage in the outboard row that holds the rollers against the cup ID. Thus, the outboard rollers, cage, and outboard seal can be installed in the cup prior to assembly of the hub into the cup.

U.S. Pat. No. 6,135,643 discloses the use of a special cage in the outboard row that holds the rollers in the cage, much the same as is used for ball bearings. Again, the outboard rollers, cage, and outboard seal can be installed in the cup prior to insertion of the hub.

U.S. Pat. No. 5,037,214 discloses a special finger type cage. Here, the special cage is used to make a true GEN III bearing, wherein both cones are integral with the hub. The problem here is providing some way to get the rollers into the bearing. Getting the outboard seal in place is secondary, as there is sufficient clearance to pull it in with a puller.

U.S. Pat. Nos. 5,454,647 and 5,494,358 disclose less desirable solution—namely that the outboard seal be big enough to pass over the rollers after the rollers and cage are assembled on the outboard integral cone.

Each of the noted solutions has its problems. Special cages cost more and require different roller loading equipment. Large diameter seals generate more heat. It would be preferable to develop a technique to assemble a hub assembly which uses a standard cage and which simplifies the placement of the seals in the hub assembly.

BRIEF SUMMARY OF THE INVENTION

In accordance with the invention, generally stated, an application tool (and a method of use of the tool) is provided for assembling an outboard seal and roller assembly into a hub unit. The tool and method allow for the use of standard seals and cage/roller assemblies, thus avoiding the problem associated with the use of special cages or oversized large-diameter seals.

An application tool of the invention includes an outer member that is at least partially hollow and an inner member which is received within the outer member and is movable axially relative to the outer member. A biasing member (such as a spring element) is placed in the outer member to bias the inner member upwardly relative to the outer member. The inner member includes plurality of pockets formed about its outer surface and which extend downwardly from its upper surface. The number of pockets formed in the inner member outer surface correspond to the number of rollers to be inserted in the outboard row of the bearing assembly of the hub unit. The inner member also includes a bore extending axially downwardly from its member upper surface which is sized and shaped to receive a spindle of the hub. The outer member has an outer diameter sized to allow the application tool to slide adjacent to and axially relative to the hub outer raceways.

The method of assembling the outboard seal into a hub unit includes (1) providing a support member with at least an outboard outer race; (2) inserting the application tool into the outboard outer race; (3) placing a cage about the application tool with the small end ring of the cage resting on the upper surface of the tool outer member and with the cage pockets generally aligned with the application tool inner member pockets; (4) placing rollers into enclosures defined by the cage pockets and the inner member pockets; (5) ensuring that the rollers contact the outer raceway; (6) fitting an outboard seal into position on the support member; (7) inserting a hub into the support member to form a hub/support member assembly in which the outboard seal is engaged with a seal surface of the hub; and (8) separating the application tool and the hub/support member assembly from each other. When the cage and rollers are placed in the tool for insertion into the hub unit; the rollers may be axially spaced from the outboard outer raceway. Hence, step (4) above involves axially moving the tool relative to the support member (and raceways) until the rollers are in contact with the raceway. During step (7), the inner member is moved axially relative to the outer member.

BRIEF DESCRIPTION OF THE SEVERAL VIEWS OF THE DRAWINGS

FIGS. 7A and 7B are top plan and side elevational views of an inner member for a third embodiment of the application tool;

FIGS. 8A and 8B are top plan and side elevational views of an outer member for the third embodiment of the application tool; and FIGS. 9A and 9B are top plan and side elevational views of the third embodiment of the application tool with a cage positioned thereon;

Corresponding reference numerals will be used throughout the several figures of the drawings.

DETAILED DESCRIPTION OF THE INVENTION

Figure 1:
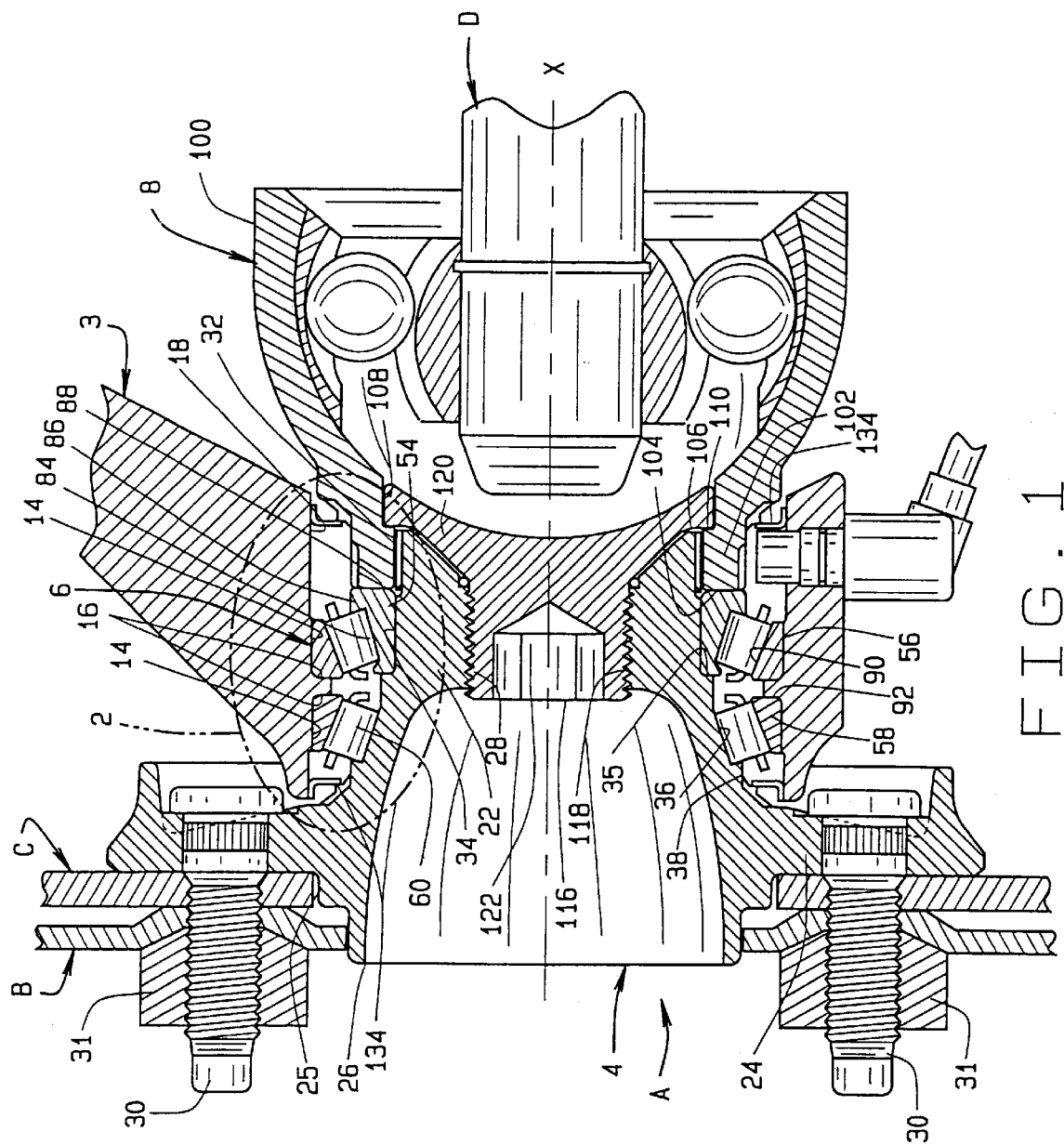
FIG. 1 is a longitudinal sectional view of a GEN III hub assembly or unit.

The following detailed description illustrates the invention by way of example and not by way of limitation. This description will clearly enable one skilled in the art to make and use the invention, and describes the best mode known for carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring now to the drawings (FIG. 1), a hub assembly A couples a road wheel B and brake rotor C for an automotive vehicle to the suspension system of the vehicle and may further couple the road wheel B to an axle shaft D forming part of the drive train for the vehicle. The suspension system includes (FIG. 1) a support or suspension member 3 that is designed to move generally vertically on the vehicle against the bias of a spring or torsion bar. Where the road wheel B that is coupled to the hub assembly A is at the front of the vehicle and thus steers the vehicle, the suspension member 3 typically takes the form of a steering knuckle. On the other hand, where the road wheel B is at the rear of the vehicle, the support member 3 may take the form of a so-called "suspension upright". In addition, the hub assembly A includes a hub 4 which rotates in the support member 3 on a bearing assembly 6 located between the hub 4 and the support member 3. Indeed, the bearing assembly 6 enables the hub 4, brake rotor C, and the road wheel B to rotate about an axis X that is fixed in position with respect to the support member 3. The hub assembly A may also include a CV (constant velocity) joint 8 which couples the hub 4 with the axle shaft D. The CV joint 8 couples the axle shaft D to the hub 4, thus enabling the road wheel B and brake rotor C to rotate with the shaft D.

The support member 3 serves as a housing for the bearing assembly 6 and to this end contains two bores 14 which receive the bearing assembly 6. The bores 14 lead up to shoulders 16 at their inner ends and at their outer ends open into counterbores 18 Which in turn open out of the support member 3. The support member 3 may be a separate housing attached to a knuckle or suspension upright.

The hub 4 includes a spindle 22 which extends into the support member 3 and a flange 24 which is formed integrally with the spindle 22 as a single casting or forging and lies outside the support member 3. In addition, the hub 4 has a wheel pilot 26 which is also formed integrally with the flange 24 and projects outwardly beyond the flange 24 in the direction opposite that in which the spindle 22 projects. The hub 4 is hollow and, at the inboard end of the spindle 22, is provided with a threaded bore 28. Finally, the hub 4 contains threaded studs 30 which project through the flange 24 and outwardly from it. Indeed, the studs 30 pass through the brake rotor C and road wheel B, beyond which they are engaged by lug nuts 31 for securing the wheel B and rotor C to the hub 4.

Figure 2:
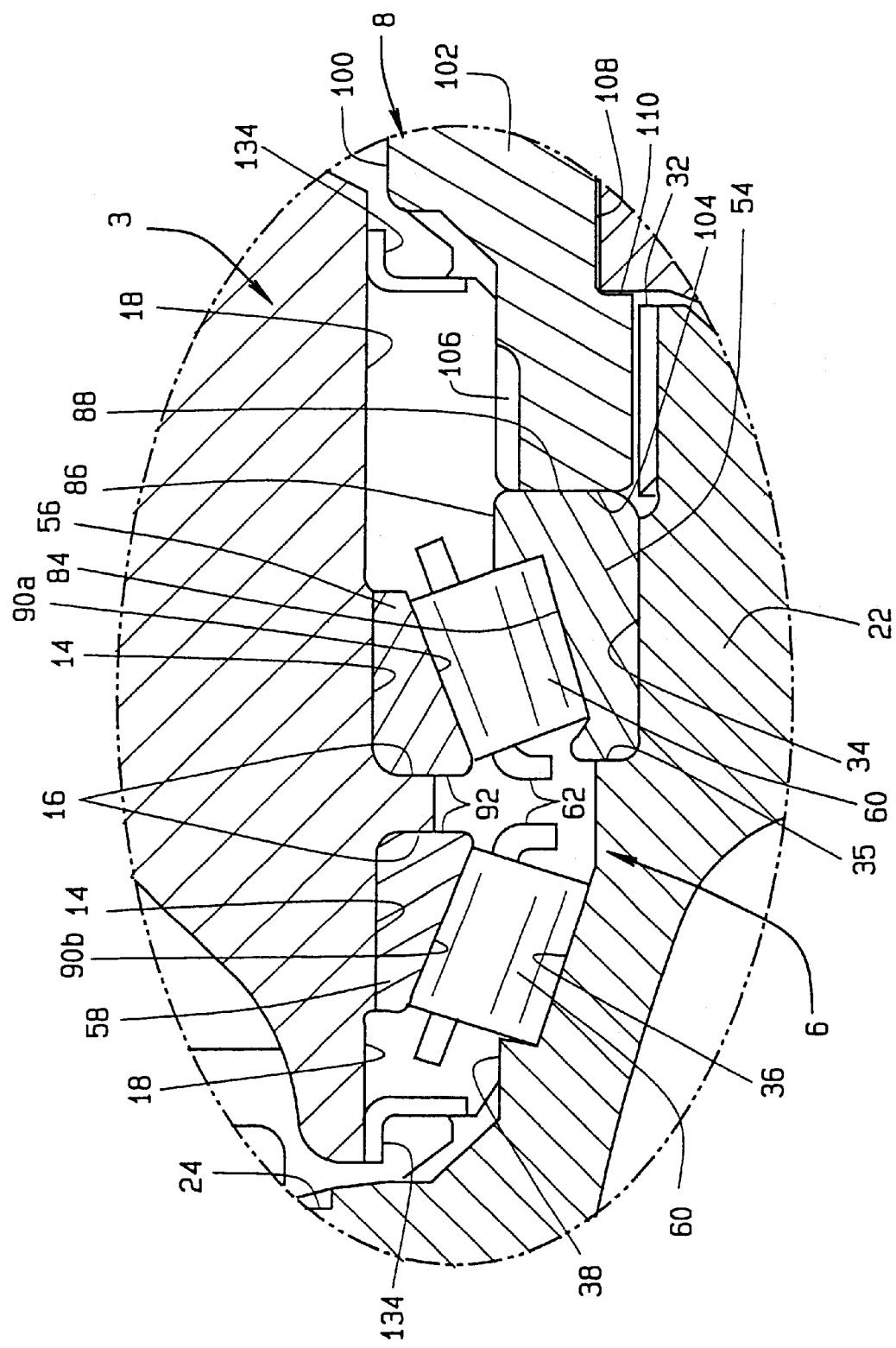
FIG. 2 is an enlarged fragmentary sectional view of the hub unit taken along the circle 2 of FIG. 1 and showing the bearing assembly of the hub.

Turning to FIG. 2, the spindle 22 at its inboard end has an external spline 32 which leads up to a cylindrical bearing seat 34 of slightly greater diameter. The bearing seat 34 includes (or surrounds) the threaded bore 28 and lies within the inboard bore 14 of the support member 3. It leads up to a shoulder 35, beyond which the spindle 22 has a tapered raceway 36 that lies within the outboard bore 14 of the member 3. Preferably, the raceway 36 is integrally formed with the spindle 22. The small end of the raceway 36 is presented toward the bearing seat 34, its diameter being greater then the diameter of the seat 34, while its large end is located at a thrust rib 38 which leads out to the flange 24. The raceway 36 and thrust rib 38, while being integral with the spindle 22 of the hub 4, actually constitute part of the bearing assembly 6.

The bearing assembly 6 includes an outboard inner race in the form of the raceway 36 and the thrust rib 38 which are integral with the spindle 22. A cone 54 located around the bearing seat 34 defines an inboard inner raceway 84. The bearing assembly also includes an inboard outer raceway 90*a* in the form of an inboard cup 56 around the cone 54 and an outboard cup 58 around the raceway 36 which forms an outboard outer raceway 90*b*. Also, the bearing assembly 6 has rolling elements in the form of tapered rollers 60 arranged in two rows, there being a separate row within each cup 56 and 58. Finally, the bearing assembly 6 within each row of tapered rollers 60 includes a cage 62 for maintaining the proper spacing between the rollers 60.

The cone 54 fits around the bearing seat 34 with an interference fit. It has a tapered raceway 84 which is presented outwardly away from the axis X and a thrust rib 86 at the large end of the raceway 84. As noted above, the raceway 84 defines an inboard inner raceway of the bearing assembly 6. The thrust rib 86 leads out to a back face 88 which is at the inner end of the spline 32 where it is squared off with respect to the axis X.

Each cup 56, 58 has a tapered raceway 90a,b that is presented inwardly toward the axis X and a back face 92 at the small ends of the raceways 90a,b, with its back face 92 likewise being squared off with respect to the axis X. As noted above, the raceways 90a,b of the cups 56 and 58 define inboard and outboard outer raceways for the bearing assembly 6. The two cups 56 and 58 fit into the bores 14 of the support member 3 with an interference fit and with their back faces 92 against the shoulders 16 at the ends of the respective bores 14. The raceway 90a on the inboard cup 56 faces and is inclined in the same direction as the raceway 84 on the cone 54; whereas the raceway 90b on the outboard cup 58 faces and is inclined in the same direction as the raceway 36 on the spindle 22.

The inboard row of tapered rollers 60 lies between the cone 54 and the inboard cup 56, where their tapered side faces contact the raceways 84 and 90a of the cone 54 and inboard cup 56, respectively, while their large end faces bear against the thrust rib 86 on the cone 54. The outboard row of tapered rollers 60 lies between the raceway 36 on the spindle 22 and the raceway 90b of the outboard cup 58, and the rollers 60 along their side faces contact those raceways 36 and 90b. The large end faces of the rollers 60 of the outboard row bear against the thrust rib 38 on the spindle 22. The rollers 60 of each row are on apex, meaning that the conical envelopes of their side faces, as well as the conical envelopes for the raceways along which they roll, have their apices at a common point along the axis. Also, the inclination of the inboard raceways 84 and 90a is opposite that of the outboard raceways 36 and 90b, so that the small ends of the rollers 60 in the inboard row are presented toward the small ends of the rollers 60 in the outboard row. This orientation enables the bearing assembly 6 to accommodate thrust loads in both axial directions. Moreover, the bearing assembly 6 is in a condition of preload so that no radial or axial clearances exist within it.

Returning to FIG. 1, the CV joint 8 includes a shell 100 having a generally cylindrical end 102 which leads out to an end face 104 that is squared off with respect to the axis X. Internally, the cylindrical end 102 has a spline 106 which extends between the end face 104 and a counterbore 108, opening into the counterbore 108 at a shoulder 110. The cylindrical end 102 fits into the inboard counterbore 18 of the support member 3 and over the inboard end of the spindle 22 where its internal spline 106 engages the external spline 32 on the spindle 22. The end face 104 on the cylindrical end 102 bears against the back face 88 of the cone 54, while the shoulder 110 lies slightly beyond the inboard end of the spindle 22.

The shell 100 of the CV joint 8 is secured to the hub 4 with a retainer 116 having a threaded plug 118 and a flange 120 directed outwardly from the plug 118. The thread on the plug 118 engages the threads of the threaded bore 28 in the spindle 22 of the hub 4, while the flange 120 lies within the shell 100 behind the shoulder 110. The plug 118 contains a socket 122 that opens into the hollow interior of the spindle hub 4, and the socket 122 is configured to receive a wrench for turning the retainer 116. When the retainer 116 is turned down, it draws the flange 120 tightly against shoulder 110 in the shell 100 of the CV joint 8. Thus, the retainer 116 captures the cylindrical end 102 of the shell 100 arid the cone 54 of the bearing 6 on the spindle 22 of the hub 4.

The support member 3 within its counterbores 18 is fitted with seals 134. The seal 134 in the inboard counterbore 18 has an elastomeric element which bears against axially and radially directed surfaces on the shell 100 of the CV joint 8, whereas the seal 134 in the outboard counterbore 18 has a elastomeric element which bears against axially and radially directed surfaces on the hub 4. Thus, the seals 134 isolate the bearing 6, retaining a lubricant within it and excluding contaminants from it.

As noted above, it would be preferable to use standard cages. However, as the hubs are made narrower, it becomes more difficult to insert the outboard seal into the hub unit or hub assembly. As discussed below, we have developed a new method of assembling a bearing assembly into a hub unit which facilitates the positioning of the outboard seal in place in the hub unit. The method, is shown generally in FIGS. 3A–F.

Figure 3A:
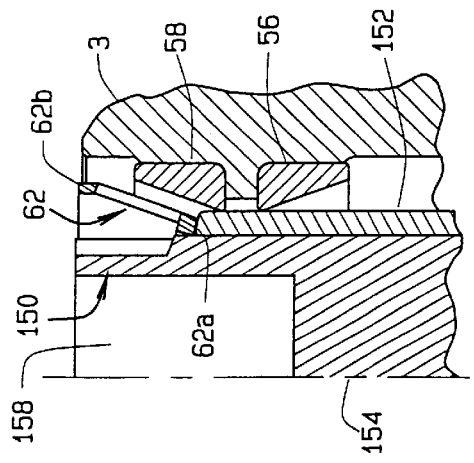
FIGS. 3A–F are cross-sectional views showing the method of the present invention for assembling the bearing assembly into the hub unit.

Turning initially to FIG. 3A, in the first step of the assembly method, the inboard and outboard cups 56 and 58 are pressed or otherwise fitted into the bores 14 of support member 3 such that the large ends 92 of the cups bear against the member shoulders 16.

Figure 4:
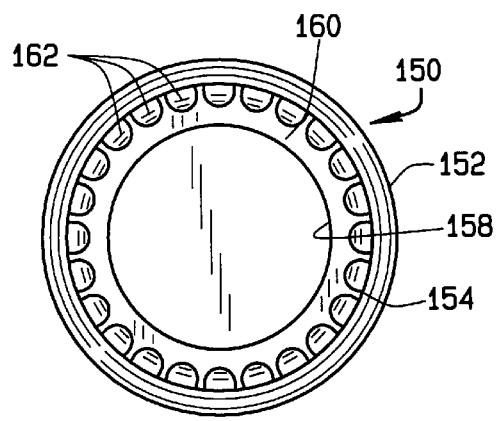
FIG. 4 is a top plan view of a roller/cage application tool used in the method.
Figure 5:
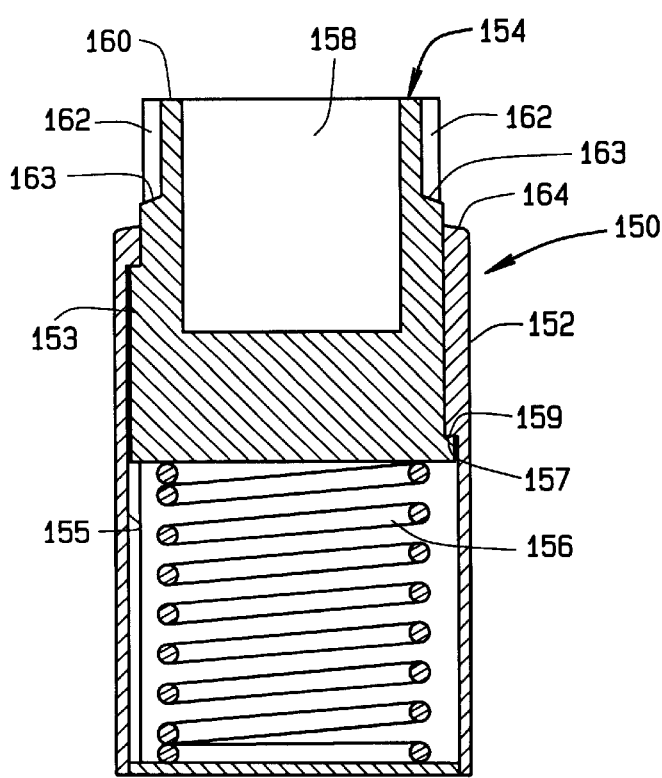
FIG. 5 is a vertical cross-sectional view of the application tool.

An application tool or fixture 150 is then used to place the cage 62, the outboard rollers 60, and the outboard seal in the support member 3. The application tool 150 (shown in FIGS. 4 and 5) is preferably mounted on a linear actuator, or other conventional mechanism which can move the application tool axially. The application tool 150 includes a hollow outer member or cylinder 152 and an inner member or cylinder 154 which is received within the outer member 152. The inner and outer members 154 and 152 are movable axially relative to each other. Preferably, the inner member is held and supported by a spring 156 which biases the inner member upwardly relative to the outer member, yet allows the inner sleeve to retract into the outer member when a force of sufficient magnitude is applied axially to the inner member. The outer member 152 has an inner shoulder 157 and the inner member has a radially outer shoulder 159. The shoulders 157 and 159 of the outer and inner members, respectively, engage each other to prevent the inner member from extending too far up axially relative to the outer member. Stated differently, the outer member shoulder 157 forms a stop which is contacted by the inner member shoulder 159 to limit the extent of axial movement of the inner member relative to the outer member.

A central bore 158 is formed in the top surface 160 of the inner member 154 and is sized and shaped to receive the hub spindle 22, as will be described below. The inner member 154 also includes a plurality of pockets or recesses 162 in the outer surface of the member 154 and which extend axially downwardly from the member top surface 160. The pockets 162 are preferably semi-circular in plan and are evenly spaced about the member 154. They have bottom surfaces 163 which slope outwardly and downwardly. As will become apparent, the pockets 162 provide a means to guide and align the rollers as they are deposited in the cage. Hence, the number of pockets 162 corresponds to the number of rollers to be installed into the cage and to the number of pockets in the cage.

Figure 3C:
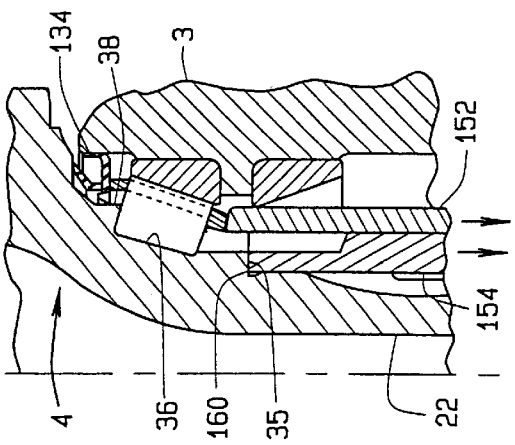
Figure 3B:
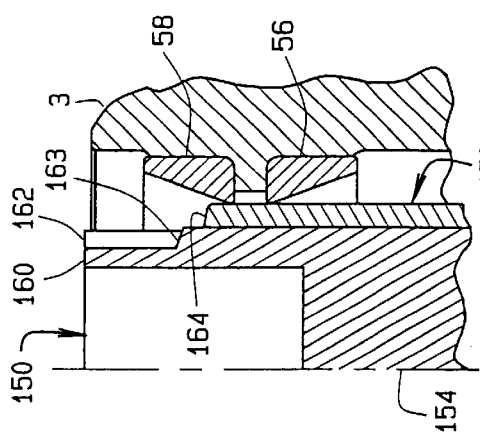

Turning to FIG. 3B, once the cups 56 and 58 have been placed in the support member 3, the application tool 150 is passed through the small inside diameter of the outer raceways or cups 56 and 58. The inner member 154 is biased upwardly by the spring 156, such that the inner member top surface 160 is spaced above the top surface 164 of the outer member 152. Preferably, as seen in FIG. 3B, the outer member top surface 164 is spaced slightly below the bottom surface 163 of the pockets 162, and the inner member top surface 160 extends slightly above the end surface of the support member 3.

As seen in FIG. 3C, the outboard cage 62 is placed around the application tool outer member 152 with its small end ring 62a sitting on the application tool outer member top surface 164. The cage large end ring 62b is above the large diameter end of the cup 58. The cage 62 is oriented about the application tool 150 such that the cage pockets are aligned with the pockets 162 in the application tool inner member 154. The gap between the bottom 163 of the application tool pockets 162 and the upper surface 164 of the application tool outer sleeve is approximately equal to the axial width of the cage's small end ring 62a, such that the axial inner surface of the small end ring 62a is approximately aligned with the sloped bottom surface 163 of the inner member pockets 162. The rollers 60 are then installed into the application tool pockets 162 and cage pockets, as seen in FIG. 3D. As can be appreciated, the application tool pockets 162 and cage pockets maintain the rollers 60 in place axially, radially, and circumferentially during the assembly process. At this point in the process, the rollers 60 are spaced axially above the cup 58.

Figure 3E:
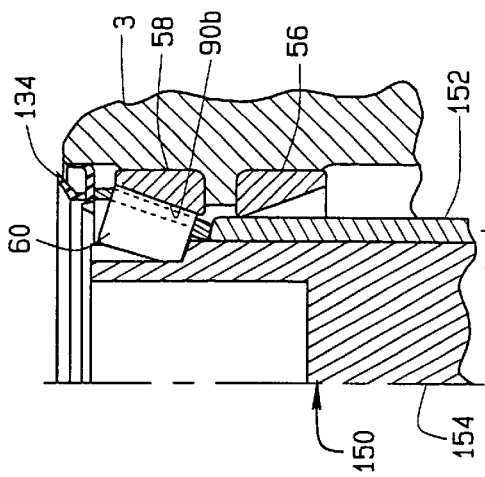
Figure 3D:
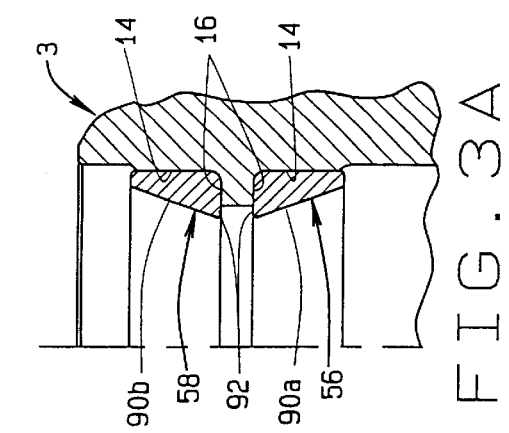

Turning to FIG. 3E, after the rollers 60 have been placed in the cage pockets and application tool, the application tool is retracted axially relative to the support member 3 such that the rollers 60 contact the outboard raceway 90b of the outboard cup 58. The application tool 150 retains control of both the cage and roller set, such that the rollers cannot escape the cage pockets. As can be seen by comparing FIG. 3D with FIG. 3E, although the application tool is moved relative to the support member 3 (and the cups 56 and 58), the outer sleeve 152 and the inner member 154 of the application tool 150 remain in the same positions relative to each other. As can be appreciated, the application tool could be moved to this position prior to placement of either the cage or the rollers on the application tool. The extended position of the application tool 150 as shown in FIGS. 3A–D facilitates placement of the cage and the rollers.

With the application tool in the position shown in FIG. 3E and the rollers 60 in contact with the cup raceway 90b, the outboard seal 134 can be pressed or otherwise fitted in to the seal recess in the support member 3.

After the seal 134 has been pressed into place, the hub 4 is placed into the roller set by inserting the hub spindle 22 into the central bore 158 of the inner member 154 until the hub shoulder 35 (against which the inboard cone 54 is pressed) contacts the upper surface 160 of the application tool inner member 154. At this point, a force is applied to the hub 4 to move the hub axially inwardly relative to the application tool 150. As this force is applied, the spring 156 is compressed, and the application tool inner member 154 is retracted into the application tool outer member 152 until the hub raceway 36 contacts the rollers 60. The application tool outer member 152 is held stationary and does not move axially during this step of the procedure. Once the hub is seated on the raceway and roller set, the linear actuator retracts in a downward motion to remove the application tool 150 from the bearing and the support member 3 for use in subsequent operations. After the application tool has been removed, a cone assembly, which includes the inboard cone 54, inboard rollers 60 and inboard cage 62 is pressed onto the bearing seat 34 such that the inboard rollers are in contact with the inboard raceway 90a of the cup 56 and the inboard cone 54 contacts the shoulder 35. The inboard seal 134 is then pressed into place to seal the bearing assembly.

To prevent rotation of the inner member 154 relative to the outer member 152, the inner member is provided with a rib 153 and the outer member is provided with a groove 155. Alternatively, the rib could be formed on the outer member and the groove could be formed on the inner member. The rib 153 and groove. 155 extend axially relative to the inner and outer members and are sized to slidably engage each other. The engagement of the rib and groove will prevent axial rotation of the inner member relative to the outer member, and hence, the alignment of the inner member pockets relative to the cage pockets.

Although the method is described to press the hub downwardly into the support member 3, the support member 3 along with the application tool 150 could be moved upwardly as a unit to press the seal 134 into place in the support member and to position the rollers 60 in contact with the hub outboard inner race 36.

As can be appreciated, the use of the application tool 150 to assemble the hub unit 4 allows for the use of a standard cage 62 in conjunction with the outboard rollers as well as a standard seal 134 at the outboard position. This, thus eliminates the extra cost associated with the use of special cages and the problems associated with oversized seals.

Figure 6:
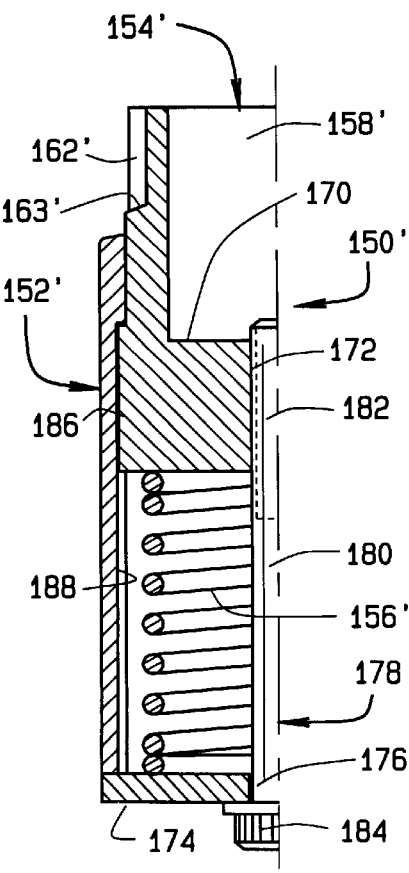
FIG. 6 is a cross-sectional view of a second embodiment of the application tool.

A variation of the application tool 150 is shown in FIG. 6. The application tool 150' includes an outer member 152' which is at least partially hollow and receives an inner member 154' such that the inner member can move axially relative to the outer member. The inner member 154' is biased upwardly relative to the outer member 152' by a spring 156'. As with the inner member 154 of FIG. 5, the inner member 154' includes a plurality of pockets or grooves 162' formed on the outer surface of the inner member. The pockets 162' extend axially downwardly from the top surface of the inner member and end in an inclined surface 163' which slopes downwardly and outwardly. A central bore 158' is formed in the inner member 154' and includes a floor 170 having a threaded opening 172 generally in the center of the floor. The bottom 174 of the outer member 152' has an opening 176 which is aligned with the opening 172 in the inner member floor 170. An adjusting screw 178 includes a shaft 180 having a threaded end 182 and a knob 184. The screw's threaded end is received in the threaded opening 172 of the inner member central bore, and the knob 184 is external of the outer member 152' to be readily accessible. As can be appreciated, by rotating the knob 184, and hence the screw threads 182, the inner member 154' will be caused to move axially relative to the outer member 152'. To maintain the rotational alignment between the inner and outer members and to maintain the alignment between the inner member pockets and the roller cage pockets, the inner and outer members are provided with a finger 186 and groove 188 which engage each other. For example, the outer member 152' can be provided with at least one, and preferably at least two, axially extending grooves 188, and the inner member can be provided with a corresponding number of fingers 186 which are received in the groove. Alternatively, the groove 188 could be formed on the inner member outer surface and the fingers could be formed on the outer member inner surface. The fingers 186 are sized to be received in the grooves 188, and hence, the engagement of the fingers and grooves will prevent the inner and outer members from rotating relative to each other as the adjusting screw 178 is turned. Additionally, the groove will dictate the extent of travel of the inner member relative to the outer member, and the shoulders 157 and 159 of the application tool 150 will not be necessary. As can be appreciated, the application tool 150' will be used in the same manner as the application tool 150. The only difference is that the application tool 150' is provided with a means (i.e., the adjusting screw 178) to move the inner member 154' relative to the outer member 152'.

Figure 3F:
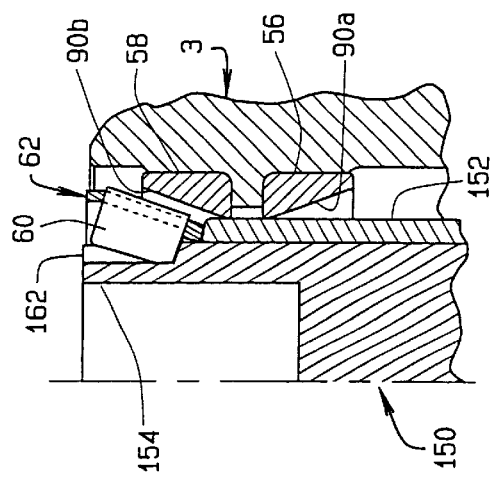

An alternative application tool 250 is shown in FIGS. 7A–9B. The application tool 250 is generally similar to the application tool 150 (and 150'), and includes an outer member 252 and an inner member 254. The inner member 254 has an outer surface with a plurality of elongate, axially extending, grooves 262, which give the inner member 254 the appearance of a cog in plan view, as seen in FIG. 7B. The grooves 262 preferably extend the full axial length of the inner member 254. As with the grooves or pockets 162, the grooves 262 are sized and shaped to receive the rollers which will be placed in the cage. The inner member 254 is shown to be hollow throughout its entire axial length. However, it need only have a hollow upper portion, corresponding to the central bore 158 of the inner member 154 (FIG. 5), to receive the hub assembly, as seen in FIG. 3F.

The outer member 252 has an outer surface 263, an inclined top surface 264, and a scalloped inner surface 266. An annular shoulder 268 is formed slightly below the top surface 264. The inclined top surface 264 slopes downwardly and outwardly, as seen in FIG. 8A. The scalloped inner surface 266 is shaped to correspond to the shape of the grooves 262 of the inner member, such that the scalloped surface 266 is received in the grooves 262, as seen in FIG. 9B. As best seen in FIG. 9A, the small end ring 62*a* of the cage 62 rests on the shoulder 268 of the outer member 252. The inner member groove 262 and the outer member inclined top surface 264, in combination, define pockets which received the rollers. As can be appreciated, the outer member inclined top surface 264 forms the floor of the roller receiving pocket.

In the application tool 150, as the hub pushes the inner member down, the rollers no longer have the axial support provided by the bottom 163 of the inner member pocket 162. Any drag between the rollers and the inner member, as the inner member drops could cause a roller to tilt back out of the pocket. Although this is not likely to happen, in the application tool 250, the pocket floor is provided by the outer member. Hence, as the inner member is moved downwardly (as in FIG. 3E), the rollers will not be deprived of any axial support, and any possibility of the rollers coming out of the inner application tool pocket is substantially eliminated.

The application tool 250 is used in substantially the same way as the application tools 150 and 150'. The major difference between the application tool 250 and the tools 150 and 150' is that the seat or floor of the pocket is formed in the outer member 252. Hence, when the inner member is moved axially downwardly relative to the outer member, the outer member inclined surface 264 will continue to provide axial support for the rollers.

As various changes could be made in the above constructions without departing from the scope of the invention, it is intended that all matter contained in the above description or shown in the accompanying drawings shall be interpreted as illustrative and not in a limiting sense. Although the method provides that in the first step, both the inboard and outboard cups are positioned in the support member 3 prior to insertion of the application tool into the member to apply the rollers, cage and outboard seal, it will be appreciated that the inboard cup 56 could be placed in the support member 3 after the outboard cup, cage, rollers, and seal are placed in the support member 3; after the hub 4 has been applied to the support member 3; and after the application tool has been withdrawn from the support member 3 (i.e., after the outboard portion of the hub unit has been assembled). Additionally, the support member 3 could be formed with one or both of the inboard and outboard outer races 90*a,b* integrally formed or machined into the support member 3. Although a coil spring is shown in the application tool 150 to bias the inner member 154 upwardly, the inner member could be biased upwardly by any conventional mechanism or resilient element which will obtain the same effect as the spring 156. For example, the coil spring 156 could be replaced with a resilient foam article, an inflatable or fillable bladder, an air spring, or any other conventional spring, a pneumatic or hydraulic cylinder, or magnetic elements. In fact, the application tool 150 could be replaced with a pneumatic or hydraulic cylinder in which the outer sleeve 152 would correspond to the outer tube or body of the cylinder and the inner member would correspond to (or be secured to) the cylinder rod. The applications tools are shown to be provided with engaging ribs and grooves to maintain the rotational orientation of the inner sleeve relative to the outer sleeve. Alternatively, the inner surface of the outer inner member and the outer surface of the inner member could be polygonal shaped to prevent rotation of the inner and outer members relative to each other. In this instance, the portion of the tool about which the cage fits would still be circular in plan. These examples are illustrative only.

What is claimed is:

1. A method of assembling the outboard seal into a hub unit for a motor vehicle; the method comprising;

providing a support member with at least an outboard outer race;

inserting an application tool into the support member; the application tool having:

an outer member, said outer member being at least partially hollow and including an outer surface and an upper surface;

an inner member received in the outer member to be movable axially relative to the outer member; said inner member having an upper surface and an outer surface, a plurality of grooves formed about said inner member outer surface and extending downwardly from said inner member upper surface; and a biasing member to bias said inner member upwardly relative to said outer member, wherein, in a relaxed state, said inner member is biased upwardly relative to said outer member such that at least a portion of said inner member grooves extend axially above said outer member upper surface;

placing a cage about said application tool; said cage including a small end ring, a large end ring; and a plurality of pockets; said cage being placed about said application tool such that said cage pockets align generally with said application tool inner member grooves;

placing rollers into enclosures defined by said cage pockets and said inner member grooves;

fitting an outboard seal into position on said support member;

inserting a hub into said support member to form a hub/support member assembly; said hub including a surface against which said outboard seal seals, and an outboard inner race against which said rollers are positioned; and separating said application tool and said hub/support member assembly from each other.

2. The method of claim 1 wherein said step of inserting said application tool into said support member comprises positioning said application tool relative to said outboard outer race such that said outer member upper surface is axially above an axial bottom edge of said outboard outer race.

3. The method of claim 2 wherein said step of placing said cage about said application tool comprises placing said cage such that the small end ring of said cage rests upon a surface of said application tool outer sleeve.

4. The method of claim 3 comprising a step of retracting said application tool relative to said member a sufficient distance such that said rollers contact the outboard outer raceway.

5. The method of claim 4 wherein, during said retracting step, said application tool inner member and said application tool outer sleeve do not move relative to each other.

6. The method of claim 1 wherein, during the step of inserting said hub into said member, said application tool inner member is moved axially downwardly relative to said outer sleeve.

7. An application tool for assembling an outboard roller assembly and an outboard seal to a vehicle hub; the application tool comprising:

an outer member, said outer member being at least partially hollow and including an outer surface and an upper surface;

an inner member received in the outer member to be movable axially relative to the outer member; said inner member having an upper surface and an outer surface, a plurality of grooves formed about said inner member outer surface and extending downwardly from said inner member upper surface; and a biasing member to bias said inner member upwardly relative to said outer member, wherein, in a relaxed state, said inner member being biased upwardly relative to said outer member such that at least a portion of said inner member grooves extend axially above said outer member upper surface.

8. The application tool of claim 7 wherein the number of grooves on said inner member outer surface correspond to the number of rollers to be included in the roller assembly.

9. The application tool of claim 7 wherein said application tool outer member has an outer diameter sized such that said application tool outer member can slide adjacent outer raceways of the hub being assembled.

10. The application tool of claim 7 wherein said application tool inner member includes a bore extending axially downwardly from said inner member upper surface; said bore being sized and shaped to receive a spindle of the hub.

11. The application tool of claim 7 wherein said inner member includes a bottom surface in each of said grooves.

12. The application tool of claim 11 wherein said groove bottom surface is an inclined surface, said bottom surface sloping downwardly and outwardly relative to said inner member.

13. The application tool of claim 7 wherein said inner member grooves extend axially substantially the length of said inner member; said outer member including an inner surface; said inner surface being shaped correspondingly to said inner member outer surface such that said outer member includes projections which are received in said inner member grooves; said outer member including an upper surface, said outer member upper surface defining a bottom surface for said groove.

14. The application tool of claim 13 wherein said groove bottom surface is an inclined surface, said bottom surface sloping downwardly and outwardly relative to said inner member.

15. The application tool of claim 7 wherein said inner member includes a bottom surface having a threaded opening therein; said application tool including an adjuster comprising shaft which is at least partially threaded at a first end thereof and a second end which is operatively accessible externally of said outer member; said threaded end of said adjuster shaft engaging said threaded opening of said inner member; whereby, rotation of said shaft will move said inner member axially relative to said outer member.

16. The application tool of claim 15 wherein one of said inner member and said outer member includes an axially extending alignment groove, and the other of said inner member and outer member includes a projection; said projection engaging said groove, the engagement of said projection and groove preventing rotation of said inner member relative to said outer member during axial translation of said inner member relative to said outer member.

17. The application tool of claim 16 wherein said alignment groove is formed on said outer member inner wall and said projection is formed on said outer surface of said inner member.

18. The application tool of claim 7 wherein said inner member and outer member are configured to prevent rotation of said inner and outer members relative to each other.

* * * * *

UNITED STATES PATENT AND TRADEMARK OFFICE
CERTIFICATE OF CORRECTION

PATENT NO.    : 6,581,288 B1
DATED         : June 24, 2003
INVENTOR(S)   : Thomas J. Rybkoski et al.

It is certified that error appears in the above-identified patent and that said Letters Patent is hereby corrected as shown below:

Column 1,
Line 35, replace ""Below center"0" with -- "Below center" --

Column 4,
Line 26, replace "Which" with -- which --

Column 6,
Line 6, replace "arid" with -- and --

Signed and Sealed this

Fifth Day of August, 2003

JAMES E. ROGAN
*Director of the United States Patent and Trademark Office*